United States Patent [19]

Haynes

[11] Patent Number: 5,864,330
[45] Date of Patent: Jan. 26, 1999

[54] METHOD AND APPARATUS FOR PROVIDING A TWO-DIMENSIONAL POSITION-SENSITIVE SCROLL ICON IN A DATA PROCESSING SYSTEM USER INTERFACE

[75] Inventor: Thom R. Haynes, Euless, Tex.

[73] Assignee: International Business Machines Corp., Armonk, N.Y.

[21] Appl. No.: 84,838

[22] Filed: Jun. 29, 1993

[51] Int. Cl.[6] ................................................. G09G 5/34
[52] U.S. Cl. .......................................... 345/123; 345/341
[58] Field of Search ........................ 395/159; 345/118, 345/121, 123, 145, 157, 159, 340, 341, 115

[56] References Cited

U.S. PATENT DOCUMENTS

| | | | |
|---|---|---|---|
| 5,075,673 | 12/1991 | Yanker | 345/123 |
| 5,169,342 | 12/1992 | Steele et al. | 395/159 |
| 5,196,838 | 3/1993 | Meier et al. | 345/118 |
| 5,263,134 | 11/1993 | Paal et al. | 345/123 |

FOREIGN PATENT DOCUMENTS 2059893  9/1992  Canada ................................. 345/123

OTHER PUBLICATIONS

DJ Schell, "Simultaneous Two Dimensional Direct Manipulation Window Scrolling", Jul. 1992, IBM Document No. AA92A062058 Microsoft Windows User's Guide, 1990–1992, pp. 386–388.

*Primary Examiner*—Lun-Yi Lao
*Attorney, Agent, or Firm*—Geoffrey A. Mantoot

[57] ABSTRACT

A two-dimensional scroll icon is provided for scrolling data in a window or panel. The scroll icon has a home position. The scroll icon can be dragged in any direction away from the home position to provide scrolling. Scrolling is in the direction along an imaginary vector extending from the home position to the scroll icon. The rate of scrolling is proportional to the distance of the scroll icon from the home position. The scroll icon also has characters located thereon. Selecting the characters toggles the visibility on and off of the vertical and horizontal scroll bars along the sides of the windows.

16 Claims, 7 Drawing Sheets

5,864,330

METHOD AND APPARATUS FOR PROVIDING A TWO-DIMENSIONAL POSITION-SENSITIVE SCROLL ICON IN A DATA PROCESSING SYSTEM USER INTERFACE

TECHNICAL FIELD OF THE INVENTION

The present invention relates to methods and apparatuses for scrolling data on user interfaces of data processing systems.

BACKGROUND OF THE INVENTION

User interfaces on data processing systems typically provide a screen for displaying data. A common format for presenting data is by windows or panels. A window has a client area, which is the area where the data is displayed.

Typically, the data is larger than the client area of a window, so that the user only views a portion of the data. To view other portions of the data, the data is scrolled through the window.

If the data is a word processing document, the user may need to only scroll in one dimension. For example, scrolling would occur from the beginning or top of the document to the end or bottom. However, on a graphical user interface, where the data that is displayed in the client area is graphical, the user may wish to scroll in two dimensions. Such two dimensional scrolling occurs up or down or right or left (from the user's perspective).

In the prior art, scrolling is accomplished by using scroll bars. Each window is provided with a vertical scroll bar (located on the right side of the window) and a horizontal scroll bar (located on the bottom side of the window). Each scroll bar has an outwardly pointing arrow at each end and a slide button movable along a track between the end arrows. To scroll in one dimension, the user interacts with the respective scroll bar by either clicking or selecting one of the end arrows, by clicking in the track area between the desired end arrow and the scroll button or by dragging the scroll button towards one of the end arrows. To scroll in two dimensions requires two separate interactions with the scroll bars, one interaction with the vertical scroll bar and the other interaction with the horizontal scroll bar. This creates extra work for the user. In addition, scroll bars take up a limited amount of the client area, thereby reducing the size of the client area and cluttering the user interface.

A prior art method of two dimensional scrolling involves dragging one of the four corners of a window with a mouse select button. One problem is that the learning curve for users of this method is substantial. Another problem is that this method is difficult for system programmers to implement because the standard scrolling interactions must be redone.

Another prior art method of two dimensional scrolling uses a mouse pointer to select a non-selectable portion of the window. For example, to scroll downward, the mouse pointer contacts the top of the window, is clicked and then dragged toward the bottom of the window. The resulting action is a scroll towards the bottom of the window. One problem with this method is that some windows do not have non-selective portions. Therefore, when the mouse pointer is dragged, the selected portion of the window will be dragged instead of the data scrolling. Another problem is that a user must regrab the window to scroll long distances. Still another problem is the lack of visual cues for scrolling with this method.

SUMMARY OF THE INVENTION

It is an object of the present invention to provide a method and apparatus for allowing two-dimensional scrolling in an easy to use and learn manner.

It is a further object of the present invention to provide a method and apparatus that allows the visibility of the horizontal and vertical scroll bars to be toggled on and off.

The present invention allows two-dimensional scrolling of data in a client area of a window on a user interface of a data processing system. An object that is associated with the window is displayed. The object occupies a home position. A user is allowed to move the object in a composite direction from the home position. The composite direction comprises two dimensions. The data is scrolled in the client area in the composite direction.

In one aspect of the present invention, the user is allowed to release the object, wherein the object is returned to its home position and the scrolling of data is stopped.

In still another aspect of the present invention, the distance that the object is located from the home position is determined and the rate of scrolling the data is proportional to the distance.

In still another aspect of the present invention, first and second dimensional scroll bars are displayed in the window. The user is allowed to select a portion of the object so as to toggle the visibility of a respective one of the first and second dimensional scroll bars in response to the user selection.

The present invention allows continuous two-dimensional scrolling in one interaction by the user. The user need not regrab portions of the window or data to continue the scroll. Instead, the user merely holds a scroll icon away from a home position to produce a continuous two-dimensional scroll. Scrolling is stopped by the user simply by releasing the scroll icon, wherein the scroll icon is automatically returned to its home position.

Two-dimensional scrolling is accompanied by providing visual cues to a user, without overly increasing the visual complexity of the user interface. By providing a scroll icon, the user is provided with visual cues as to how to scroll two-dimensionally. The visual complexity is not increased, as the scroll icon may have its home position in a corner of the window.

The scroll icon can be used with current scroll bars, making it easy for a systems programmer to implement and for a user to learn. The scroll bars can be removed from the display ("turned off") to slightly enlarge the client area and to further simplify the user interface.

DESCRIPTION OF THE INVENTION

Figure 1:
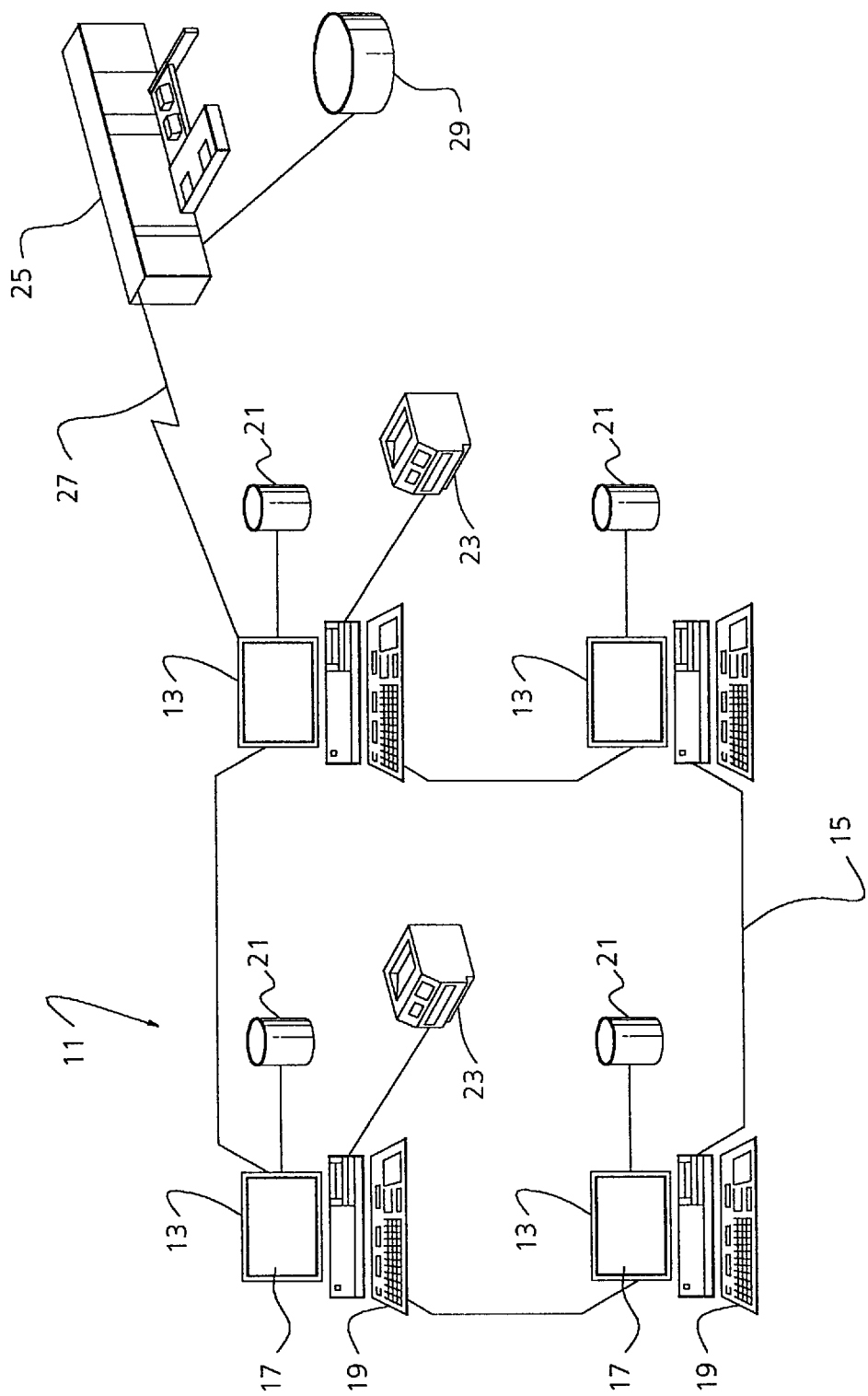
FIG. 1 is a schematic diagram of a data processing system on which the present invention can be practiced.

In FIG. 1, there is shown a schematic diagram of a data processing system 11, upon which the present invention can be practiced. The data processing system 11 includes plural individual computers or workstations 13 which are connected together in a local area network (LAN) 15. Each workstation 13 includes a user interface, which has a display screen 17 and a keyboard 19. Each workstation 13 may also be coupled to a storage device 21 and to a printer or output device 23. One or more of such storage devices 21 may be utilized, in accordance with the present invention, to store applications or resource objects which may be periodically accessed by any user within the data processing system 11.

The data processing system 11 may also include a mainframe or host computer 25 that is coupled to one of the workstations by a communication link 27. The host computer 25 may also be coupled to a storage device 29 which may serve as a remote storage for the computers.

Figure 2:
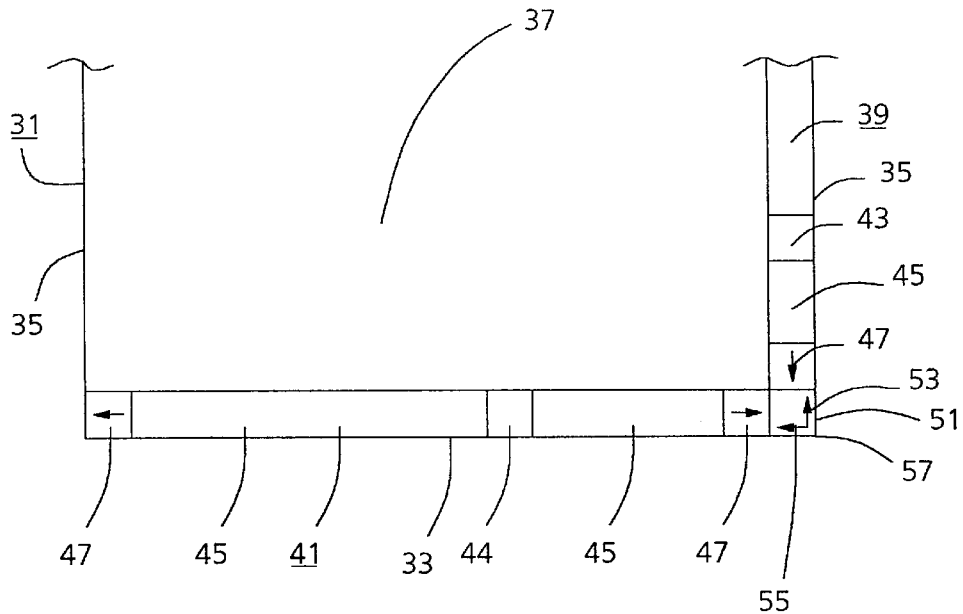
FIG. 2 is a schematic view of a lower portion of a window or panel, showing the two-dimensional scroll icon of the present invention, in accordance with a preferred embodiment.

On a computer screen 17, one or more windows or panels may be displayed. FIG. 2 shows a lower portion of a typical window 31. The window has bottom and side borders 33, 35 and a client area 37 for displaying data. For example, if the application being executed in the window is a word processing program, then the client area 37 would contain text. Vertical and horizontal scroll bars 39, 41 are located along the right side and bottom, respectively, of the window. Each scroll bar has a scroll button 43, 44 which moves one dimensionally along a track 45. For example, the horizontal scroll bar button 44 moves either right or left. Also, each scroll bar has an outwardly pointing arrow 47 at each end.

Located at the intersection of the scroll bars is a two-dimensional scroll icon 51. In the preferred embodiment, the scroll icon has an upwardly pointing arrow 53 to indicate the vertical direction and a leftwardly pointing arrow 55 to indicate the horizontal direction.

In FIG. 2, the scroll icon 51 is shown in its home position, which in the preferred embodiment is the lower right corner 57 of the window 31. To scroll data in the client area, the scroll icon is dragged in the desired direction. For example, referring to FIG. 3, the scroll icon 51 is dragged to the upper left from its home position (the dashed line 60 indicates the trajectory of the scroll icon). This displacement of the scroll icon from its home position produces a scrolling action of the data from the lower right hand corner of the window toward the upper left, in the direction of an imaginary vector located from the home position to the displaced scroll icon. The scroll icon is moved or dragged with the mouse pointer 59.

As the data scrolls, the vertical and horizontal scroll buttons 43, 44 move respectively upwardly and to the left to new positions 43A, 44A. The distance of scroll button movement corresponds to the distance of scrolling along the respective dimension. The scroll buttons allow the user to monitor the scrolling.

One dimensional scrolling can occur using either a scroll button or else by moving the scroll icon 51 either vertically or horizontally from the home position 57.

The scroll icon can be moved from the home position 57 in any direction. For example, the scroll icon can be moved to the lower right from the home position, as shown by the dashed scroll icon 62 in FIG. 3.

The rate of scrolling is determined by the distance of the scroll icon 51 from the home position 57. The further away the scroll icon is from the home position, then the faster the scrolling. Suppose, for example, that a user is viewing a word processing document in the window. The user is near the bottom of the document, but wishes to scroll to a position near the top. The user drags the scroll icon 51 in the upward direction. To increase the speed of scrolling, the user drags the scroll icon further from the home position. As the scrolling gets nearer to the top of the document, the user can move the scroll icon closer to the home position to slow the rate of scrolling and to avoid overshooting the desired position or location.

When the desired data is present in the client area, the user releases the scroll icon 51, whereupon the scroll icon automatically returns to its home position 57 and scrolling immediately stops.

Figure 4:
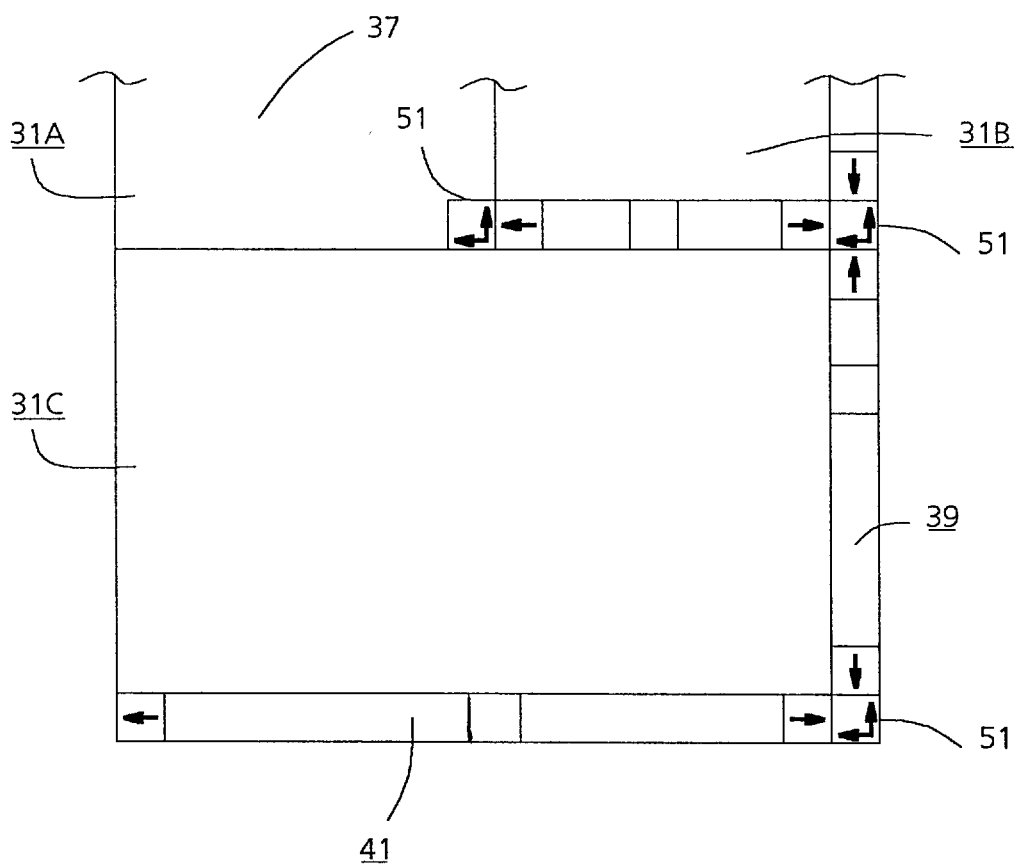
FIG. 4 is a schematic view showing plural windows or subpanels, each of which has a two-dimensional scroll icon, with one of the subpanels shown without the scroll bars.

In order to increase somewhat the size of the client area 37, the scroll bars 39, 41 can be removed from the window 31. Likewise, once removed, the scroll bars can be returned to the display. This toggling of scroll bar visibility is accomplished with the scroll icon 51. To toggle the vertical scroll bar, the user selects (for example by clicking) the up arrow 53. If the vertical scroll bar is visible, selecting the up arrow 53 removes the vertical scroll bar. If the vertical scroll bar is not visible, then selecting the up arrow 53 causes the vertical scroll bar to be displayed. To toggle the horizontal scroll bar, the user selects the left arrow 55. In FIG. 4, the subwindow 31A that is shown in the upper left is shown without the horizontal and vertical scroll bars. Data can be displayed in the spaces formally occupied by the scroll bars.

FIG. 4 also illustrates that each window or subwindow 31A, 31B, 31C is provided with its own scroll icon 51.

Referring now to the flow chart of FIGS. 5a–5d, the method of the present invention will now be described. In the flow charts, the following graphical conventions are observed: a rectangle for either a process, function or screen display, a diamond for a decision and a circle for a connector in exiting to or entering from another part of the flow chart. These conventions are well understood by programmers skilled in the art of user interfaces and the flow charts are sufficient to enable a programmer skilled in the art to write code in any suitable computer programming language, such as BASIC, PASCAL or C for a computer such as the IBM Personal System/2 (PS/2) family of computers which supports these languages.

Figure 5A:
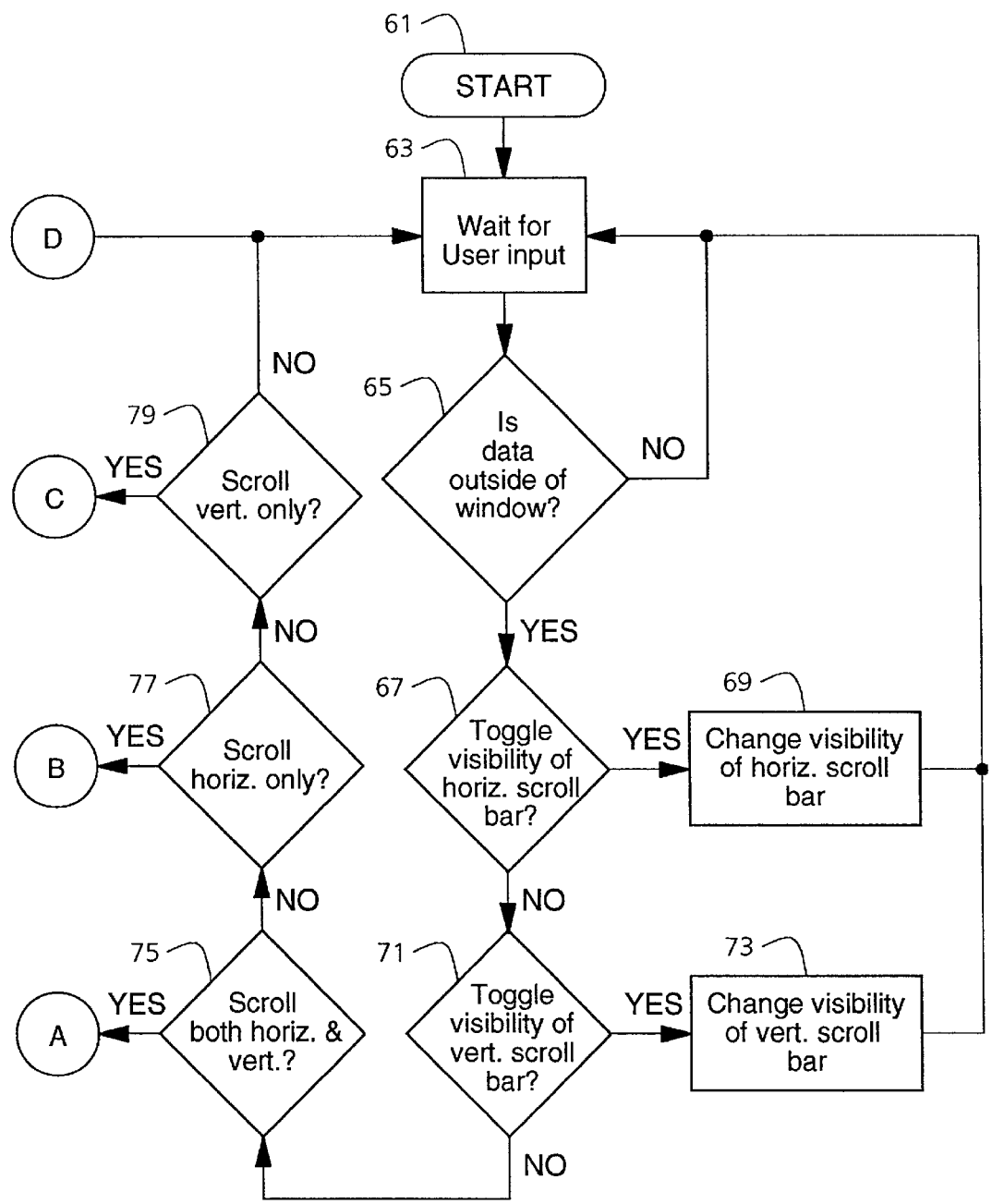
FIGS. 5a–5d are a flow chart showing the method of the present invention, in accordance with a preferred embodiment.

Beginning with FIG. 5a, the method starts, step 61. The method waits for a user input regarding the scroll icon 51, step 63. The user input could be a dragging of the scroll icon 51, or a selection of one of the arrows 53, 55 on the scroll icon (see FIG. 2). In step 65, the method determines if there is data located outside of the window. If NO, that is the client area 37 is showing all of the data in the window, then the method returns to step 63 to wait for another user input. If YES, then the method proceeds to step 67.

In step 67, the method determines if the user input is to toggle the visibility of the horizontal scroll bar 41. This particular user input is accomplished when the user selects the left arrow 55 in the scroll icon 51 (see FIG. 2). If YES, then the method proceeds to step 69, wherein the visibility of the horizontal scroll bar is changed. If the horizontal scroll bar is visible, then it is removed from the display. If the horizontal scroll bar is invisible, then it is returned to the display. The method then returns to step 63.

If the result of step 67 is NO, then in step 71, the method determines if the user input is to toggle the visibility of the vertical scroll bar 39. This particular user input is accomplished when the user selects the up arrow 53 of the scroll icon 51. If the result of step 71 is YES, then the method proceeds to step 73, wherein the visibility of the vertical scroll bar is changed in the same manner as for the horizontal scroll bar.

If the result of step 71 is NO, then the method proceeds to step 75 to determine if the user input is to scroll in both the horizontal and vertical directions. If YES, then the method proceeds to step 81 in FIG. 5b. If NO, then the method proceeds to step 77 in FIG. 5a to determine if the user input is to scroll only in the horizontal direction. If the result of step 77 is YES, then the method proceeds to step 93 of FIG. 5c. If the result of step 77 is NO, then the method proceeds to step 79 in FIG. 5a to determine if the user input is to scroll in only the vertical direction. If the result of step 79 is YES, then the method proceeds to step 105 of FIG. 5d. If the result of step 79 is NO, then the method returns to step 63.

Figure 5B:
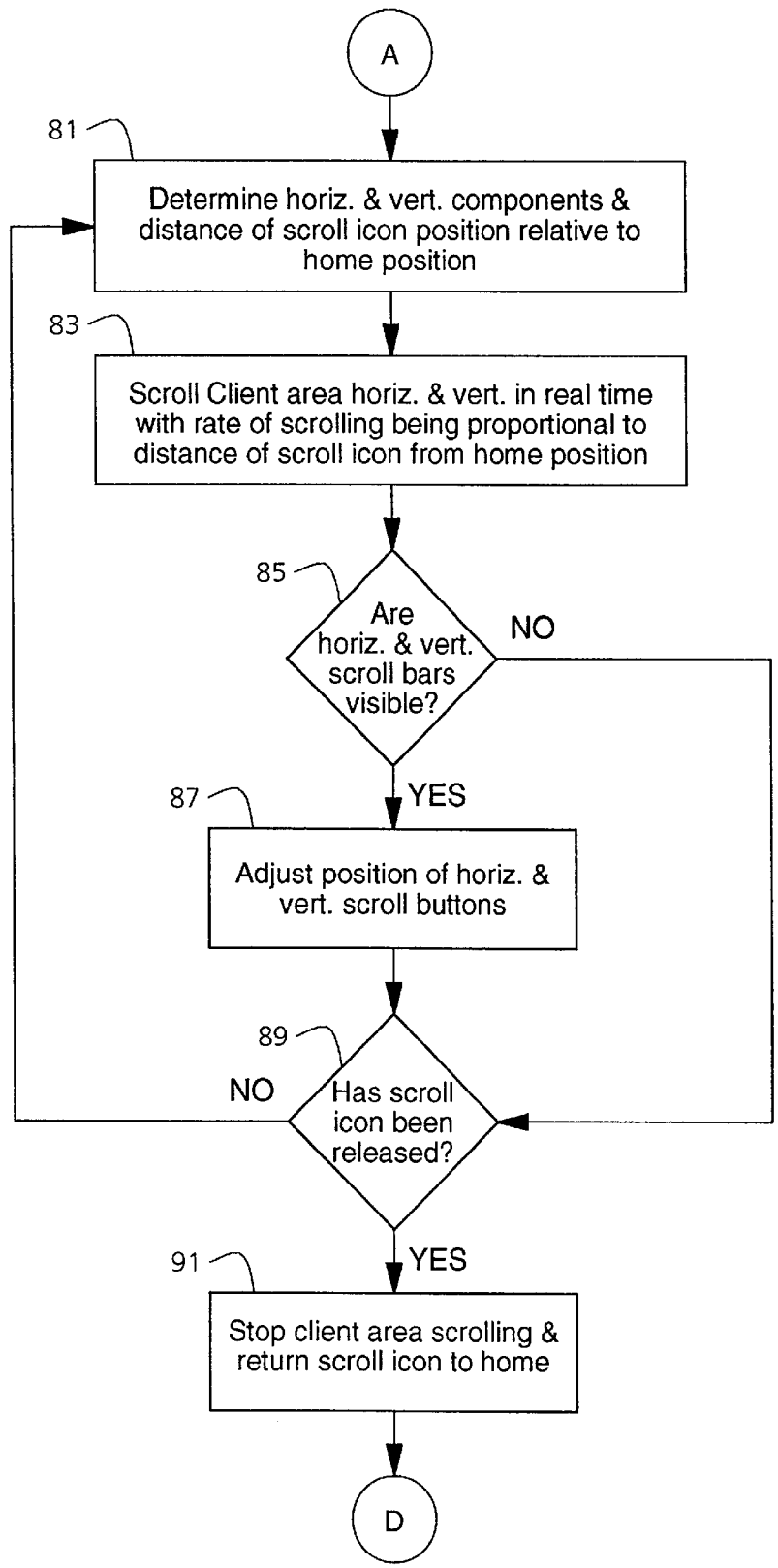

Referring now to FIG. 5b, if the user input is to scroll in both the horizontal and vertical directions (that is two-dimensional scrolling), then in step 81, the method determines the horizontal and vertical components of the scroll icon position relative to the home position using trigonometric relationships. In addition, the distance between the scroll icon and the home position is determined. In step 83, the client area or data is scrolled in real time. The direction of scrolling is along the horizontal and vertical components determined in step 81. For example, if the scroll icon is located at 45 degrees above a horizontal line and to the left of a vertical line going through the home position, then the data is scrolled at 45 degrees to the upper left. That is, for every one unit of vertical scrolling, one unit of horizontal scrolling also occurs.

The rate of scrolling is proportional to the distance of the scroll icon from the home position. For example, if the scroll icon is located two inches away from the home position, then the data would scroll at a rate of two inches per second. If the scroll icon is located three inches from the home position, then the rate of scrolling would increase to three inches per second. The rate of scrolling need not be a linear function, but could be a non-linear function. For example, if the scroll icon is moved from two inches to three inches away from the home position, then the rate of scrolling could increase from two inches per second to five inches per second. Alternatively, the rate of scrolling could decrease as the distance of the scroll icon increases from the home position.

Figure 3:
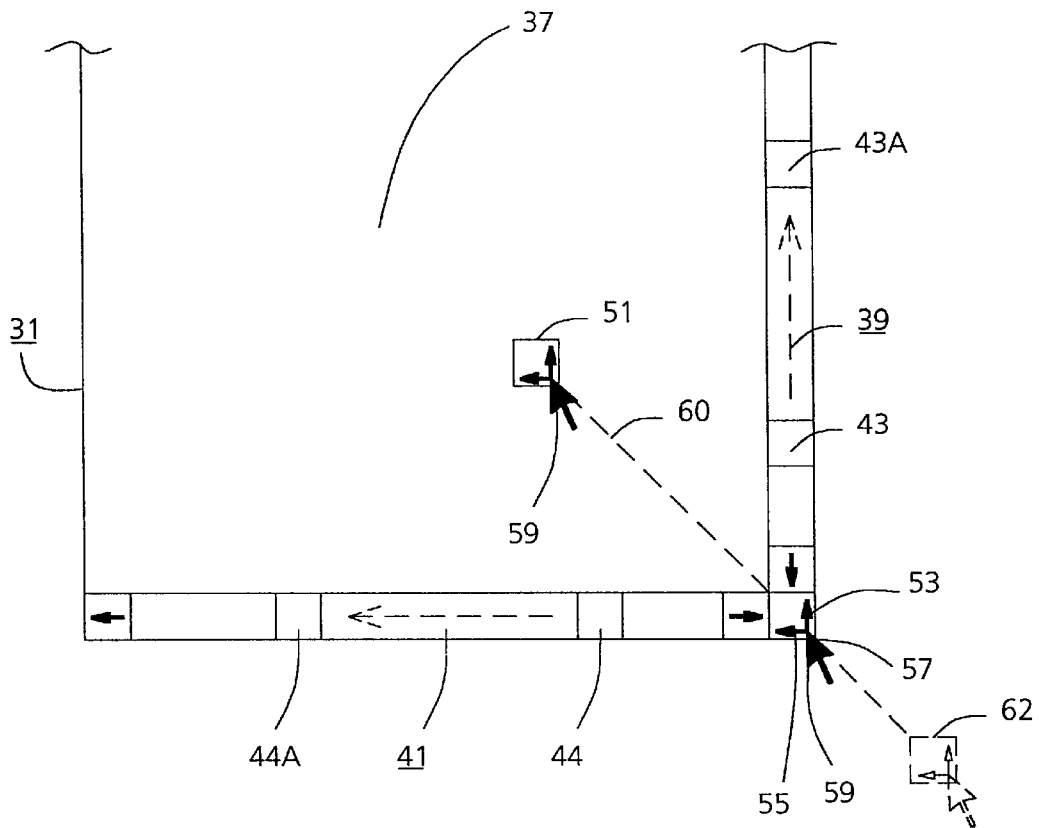
FIG. 3 is a schematic view of a lower portion of a window or panel, showing the two-dimensional scroll icon dragged to several positions to implement two-dimensional scrolling.

In step 85, the method determines if the horizontal and vertical scroll bars are visible. If YES, then the positions of the scroll buttons 43, 44 are adjusted, step 87, as shown in FIG. 3. The horizontal scroll button 44 is moved a distance corresponding to the horizontal component determined in step 81. Likewise, the vertical scroll button 43 is moved a distance corresponding to the vertical component. For example, if the total area of data (shown in the window and located outside of the window) is 100 units horizontal by 100 units vertical, and the scroll icon 51 is located 45 degrees to the upper left of the home position, then scrolling the data 2 units in the horizontal and 2 units in the vertical causes the horizontal and vertical scroll buttons to move 2% of the track length to the left and top respectively. The method proceeds to step 89. If the result of step 85 is NO, then the method proceeds to step 89.

In step 89, the method determines if the scroll icon 51 has been released. If NO, then scrolling continues, step 81 and the following steps. If YES, then scrolling is stopped and the scroll icon is returned to its home position, step 91. The method then returns to step 63, FIG. 5a.

Figure 5C:
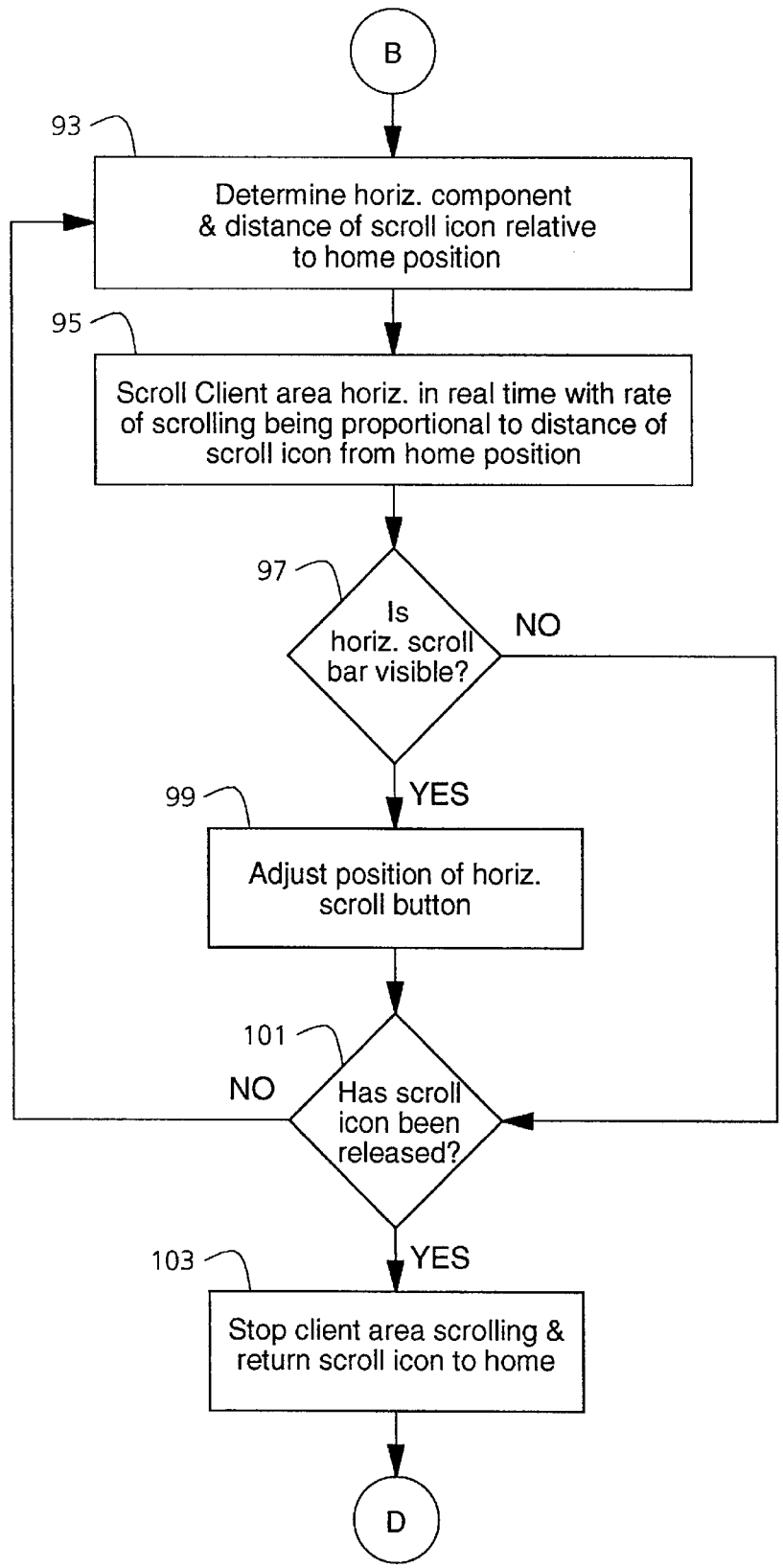
Figure 5D:
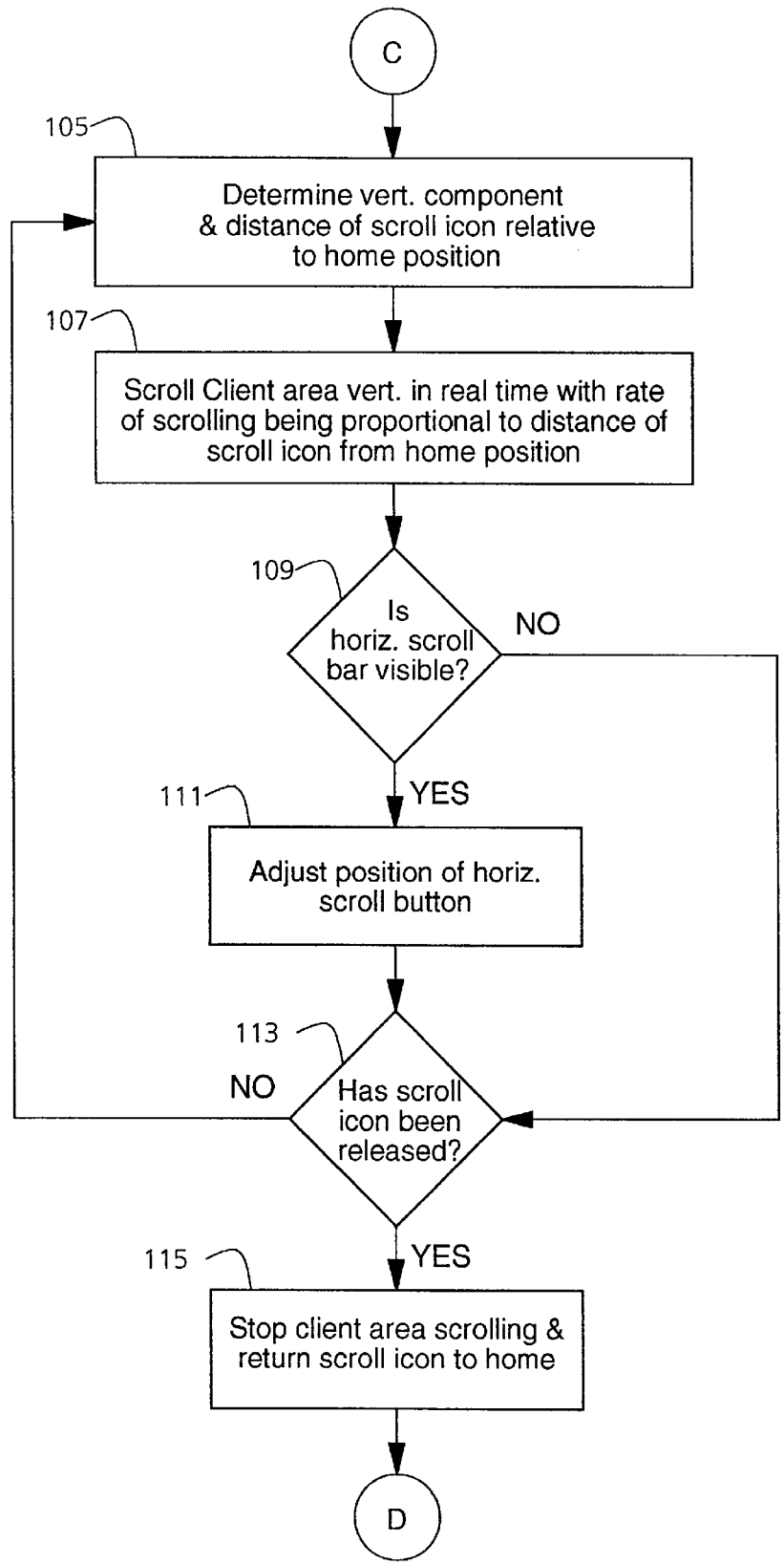

The methods of FIGS. 5c and 5d are similar to the method of FIG. 5b, with the exception being that movement is in a respective horizontal direction or vertical direction. Referring to FIG. 5c, if the user input is to scroll in only a horizontal direction, then in step 93, the method determines the horizontal component of the scroll icon position relative to the home position. In addition, the distance between the scroll icon and the home position is determined. In step 95, the client area or data is scrolled in the determined horizontal direction in real time. The rate of scrolling is proportional to the distance of the scroll icon in the home position. In step 97, the method determines if the horizontal scroll bar is visible. If YES, then the position of the scroll button 44 is adjusted, step 99. The method proceeds to step 101. If the result of step 97 is NO, then the method proceeds to step 101.

In step 101, the method determines if the scroll icon has been released. If NO, then scrolling continues by returning to step 93. If YES, then scrolling is stopped, and the scroll icon 51 is returned to its home position, step 103. The method then returns to step 63, FIG. 5a.

Referring to FIG. 5d, if the user input is to scroll in only a vertical direction, then in step 105, the method determines the vertical component of the scroll icon position relative to the home position. In addition, the distance between the scroll icon and the home position is determined. In step 107, the client area or data is scrolled in real time along the designated vertical direction. The rate of scrolling is proportional to the distance of the scroll icon from the home position. In step 109, the method determines if the vertical scroll bar is visible. If YES, then the position of the scroll button 43 is adjusted, step 111. The method proceeds to step 113. If the result of step 109 is NO, then the method proceeds to step 113.

In step 113, the method determines if the scroll icon has been released. If NO, then scrolling continues, step 105. If YES, then scrolling is stopped and the scroll icon 51 is returned to its home position, step 115. The method then returns to step 63, FIG. 5a.

Although the home position of the scroll icon has been shown in the lower right corner of a window, it may be in another location.

Although the present invention has been described as providing a rate of scrolling that is proportional to the distance of the scroll icon from the home position, this need not be the case. For example, the rate of scrolling could be constant and therefore independent of the distance of the scroll icon from the home position. Alternatively, the rate of scrolling in one dimension could be different from the rate of scrolling in the other dimension.

The foregoing disclosure and the showings made in the drawings are merely illustrative of the principles of this invention and are not to be interpreted in a limiting sense.

What I claim is:

1. A method of two-dimensionally scrolling data in a client area of a window on a user interface of a data processing system, comprising the steps of:
   a) providing an object included as a part of said window, said object occupying a home position;
   b) allowing a user to move said object in a composite direction from said home position, said composite direction comprising a first directional component and a second directional component, said second directional component being orthogonal to said first directional component; and
   c) scrolling said data in said client area in said composite direction.

2. The method of claim 1 further comprising the steps of:
a) allowing said user to release said object;
b) returning said released object to said home position; and
c) stopping the scrolling of said data when said object is released.

3. The method of claim 2 further comprising the steps of:
a) determining the distance that said object is located from said home position; and
b) said step of scrolling said data further comprises the step of scrolling said data at a rate that is proportional to said distance.

4. The method of claim 1 further comprising the steps of:
a) determining the distance that said object is located from said home position; and
b) said step of scrolling said data further comprises the step of scrolling said data at a rate that is proportional to said distance.

5. The method of claim 1 wherein said step of displaying said object further comprises the step of displaying a scroll icon in a corner of said window.

6. The method of claim 1 further comprising the steps of:
a) displaying first and second one dimensional scroll bars in said window;
b) allowing said user to select a portion of said object; and
c) toggling the visibility of a respective one of said first and second one dimensional scroll bars in response to said user selection.

7. The method of claim 1, further comprising the step of displaying first and second one dimensional scroll bars in said window, with each of said scroll bars having a respective scroll button movable along said respective scroll bars.

8. The method of claim 7, further comprising the step of moving said scroll buttons in response to said scrolling of data in said composite direction.

9. An apparatus for two-dimensionally scrolling data in a client area of a window on a user interface of a data processing system, comprising:
a) means for providing an object included as part of said window, said object occupying a home position;
b) means for allowing a user to move said object in a composite direction from said home position, said composite direction comprising a first directional component and a second directional component, said second directional component being orthogonal to said first directional component; and
c) means for scrolling said data in said client area in said composite direction.

10. The apparatus of claim 9 further comprising:
a) means for allowing said user to release said object;
b) means for returning said released object to said home position; and
c) means for stopping the scrolling of said data when said object is released.

11. The apparatus of claim 10 further comprising:
a) means for determining the distance that said object is located from said home position; and
b) said means for scrolling said data further comprises means for scrolling said data at a rate that is proportional to said distance.

12. The apparatus of claim 9 further comprising the:
a) means for determining the distance that said object is located from said home position; and
b) said means for scrolling said data further comprises means for scrolling said data at a rate that is proportional to said distance.

13. The apparatus of claim 9 wherein said means for displaying said object further comprises means for displaying an icon in a corner of said window.

14. The apparatus of claim 9, further comprising:
a) means for displaying first and second one dimensional scroll bars in said window;
b) means for allowing said user to select a portion of said object; and
c) means for toggling the visibility of a respective one of said first and second one dimensional scroll bars in response to said user selection.

15. The apparatus of claim 9, further comprising means for displaying first and second one dimensional scroll bars in said window, with each of said scroll bars having a respective scroll button movable along said respective scroll bars.

16. The apparatus of claim 15, further comprising means for moving said scroll buttons in response to said scrolling of data in said composite direction.

* * * * *